Feb. 19, 1952     F. N. TULLOS     2,586,745
ACOUSTIC WELL LOGGING
Filed Nov. 26, 1947
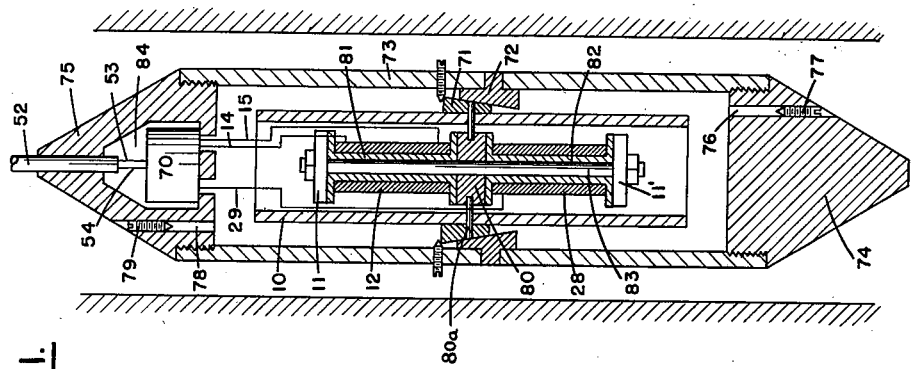
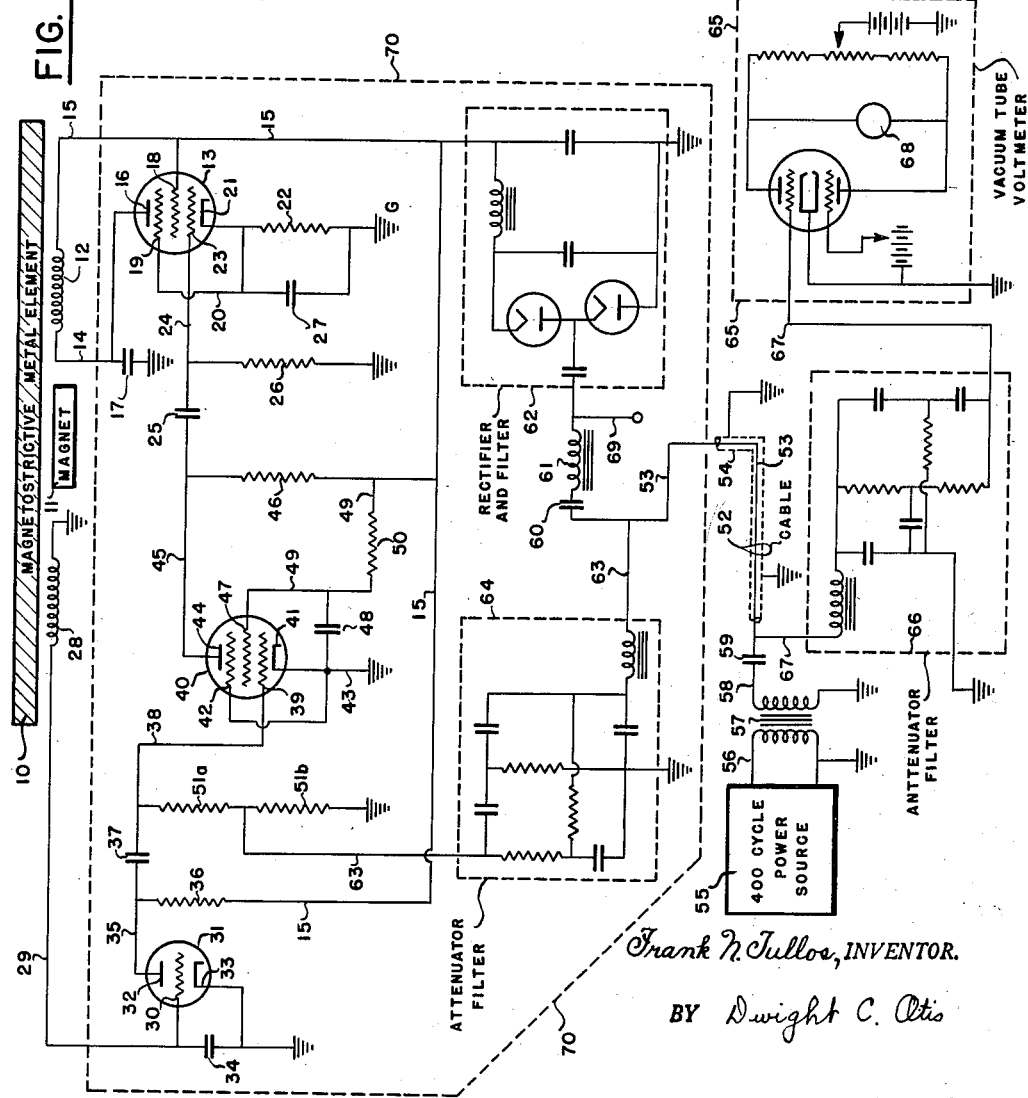
Frank N. Tullos, INVENTOR.
BY Dwight C. Otis
AGENT.

Patented Feb. 19, 1952

2,586,745

UNITED STATES PATENT OFFICE 2,586,745

ACOUSTIC WELL LOGGING

Frank N. Tullos, Houston, Tex., assignor, by mesne assignments, to Standard Oil Development Company, Elizabeth, N. J., a corporation of Delaware Application November 26, 1947, Serial No. 788,259

7 Claims. (Cl. 178—44)

The present invention is directed to improvements in self-controlled oscillators. More particularly, the invention is directed to improvements in a magnetostriction transducer involving a self-controlled magnetostriction oscillator. In a particular embodiment, the invention relates to improvements in a device for acoustic impedance logging of subsurface formations penetrated by a borehole in which device a magnetostriction transducer is employed to generate acoustic waves and measure acoustic energy reflected into the transducer by the various subsurface formations.

It is well known to produce audio frequency and radio frequency energy by means of electron discharge tube networks of the type commonly referred to as "self-controlled oscillators" in which a small portion of the output energy is fed from the output circuit of the network into the input circuit thereof. It is also well known to control the frequency of the energy by electro-mechanically coupling a portion of the energy taken from the output circuit through a magnetorestrictive element, which is resonant at the desired frequency, and feeding this electro-mechanically coupled energy into the input circuit of the network.

In copending application Serial No. 597,408, filed June 4, 1945, for Clare H. Kean, and now abandoned, there is described a method for logging subsurface formations penetrated by a borehole by moving through the borehole a magnetostrictive element capable of generating cylindrically symmetric acoustic waves and measuring variations in electrical characteristics of the magnetostrictive device, which variations are a function of acoustic waves reflected back from the subsurface formations into the magnetostriction transducer.

In copending application Serial No. 763,940, filed July 26, 1947, for said Kean, now Patent No. 2,530,971, November 21, 1950, various embodiments of apparatus suitable for the practice of the aforementioned method are disclosed and claimed. One of the disclosed embodiments includes a self-controlled electron discharge tube oscillator having a pair of solenoids electro-mechanically coupled to each other through an elongated magnetostrictive element. The magnetostrictive element and oscillator are enclosed in a case adapted to be moved through a borehole by means of a cable having conductors connecting the oscillator to a power source and electrical measuring equipment arranged at the surface of the earth. The present invention is concerned with novel improvements which are particularly useful in apparatus and in the practice of certain aspects of the method disclosed in the aforementioned applications.

It is one object of the present invention to provide means for controlling a self-excited electron discharge tube oscillator whereby the voltage output of said oscillator remains substantially constant with variations in output loading.

It is another object to provide means for controlling magnetostriction transducers having electron discharge tube driving means whereby the excitation and hence the power output of said transducer remains substantially constant with variations in load.

It is still another object of my invention to provide improvements in a well logging device employing a magnetostriction transducer whereby the power output thereof is maintained substantially constant and the sensitivity of measurements made therewith is improved.

It is a further object of my invention to provide improved apparatus for producing a continuous record, or log with respect to depth in a borehole, of a value which is proportional to a function of the acoustic impedance of successive earth formations along the borehole.

Other and further objects of my invention will be apparent from the following description when read in conjunction with the accompanying drawing in which Fig. 1 is a schematic wiring diagram of a self-excited magnetostriction oscillator or transducer and associated elements including the improvements of my invention, and Fig. 2 is an elevation view, partly in section, of a well logging device adapted to be used with the apparatus shown in Fig. 1 when logging subsurface formations penetrated by a borehole.

Referring first to Fig. 1, the numeral 10 designates a magnetostrictive metal element such as a nickel, chromium, or chromium-nickel alloy tube or bar. Element 10 is polarized by magnetic means 11 represented schematically as a permanent magnet adjacent element 10. Electro-magnetically coupled to element 10 is a first solenoid 12 which is electrically connected as an impedance in the output anode or plate circuit of an electron discharge tube 13 by means of conductor 14. Solenoid 12 is also connected by means of conductor 15 to a source of direct current as will be more fully explained hereinafter.

Tube 13 may be any suitable type of electron discharge tube such as a conventional triode, tetrode or pentode, capable of developing sufficient alternating current voltage output so that, when the voltage is impressed across solenoid 12, it will cause element 10 to vibrate in known manner. In the drawing I have shown tube 13 as a single pentode having an anode 16 connected to conductor 14 and by-passed to common ground through capacitor 17, a screen grid 18 connected to conductor 15, a suppressor grid 19 connected by conductor 20 to cathode 21 which in turn is connected through bias resistor 22 to common ground G. Tube 13 also is provided with a signal or control grid 23 which may be connected through conductor 24 to a coupling capacitor 25 and through resistor 26 to common ground. Cathode bias resistor 22 is preferably by-passed by a capacitor 27. It will be seen that solenoid 12, conductors 14 and 15, anode 16, and capacitor 17 constitute the anode output circuit of the electron tube network associated with tube 13 and that the circuit is completed through a power source and thence through resistor 22 and cathode 21. Likewise signal grid 23, conductor 24 and resistor 26 constitute the signal input circuit of the network. As will be apparent to workers in the art, solenoid 12 and element 10 constitute means for deriving output energy from the network associated with tube 13.

If desired electron tube 13 may be replaced by a plurality of electron discharge tubes having their respective elements connected in parallel in a manner well known in the art when it is desired to obtain greater power output than is available from a single tube.

Electromagnetically coupled to element 10 is a second solenoid 28 having one end connected to common ground and the other end connected by means of conductor 29 to the signal grid 30 of an electron discharge tube 31 which is preferably of the triode type having an anode 32 and a cathode 33. In Fig. 1, a signal grid 30 is shown as provided with a by-pass capacitor 34 connected to cathode 33 and common ground. Also, anode 32 is shown connected through conductor 35 and load resistor 36 to conductor 15 leading to a source of direct current power. Thus, solenoid 28, conductor 29, signal grid 30, cathode 33 and capacitor 34 constitute the signal input circuit of the network associated with tube 31, while anode 32, conductor 35, resistor 36, conductor 15 and cathode 33 constitute the anode output circuit which is completed through a power source.

It will be understood by skilled workers in the art that the number of elements within tube 31 and their connection to other elements may be varied so long as tube 31 is arranged to produce across load resistor 36 an amplified reproduction of the alternating current voltage derived from solenoid 28.

In the prior art it is conventional to connect anode 32 and load resistor 36 through conductor 35 to coupling capacitor 25 whereby the alternating component of voltage developed across resistor 36 is impressed upon the signal grid of tube 13. The solenoid 28, by virtue of its electromechanical coupling to solenoid 12 through element 10, constitutes means for coupling a portion of the output energy derived from tube 13 into the input circuit of tube 31 to sustain oscillation in the system. It will be seen that, when a large amount of energy is absorbed from element 10, the energy electromechanically coupled back from solenoid 12 to solenoid 28 through element 10 is reduced and, accordingly, the voltage generated in solenoid 28 by virtue of the movement of slightly magnetized element 10 within the electromagnetic field of solenoid 28 is also reduced as compared with conditions when little energy is absorbed from element 10. The reduced voltage across solenoid 28 results in a reduced alternating voltage output across anode load resistor 36 and thus a reduced voltage across the signal grid circuit of tube 13. This latter reduced voltage results in a reduced voltage output from tube 13 across solenoid 12. Under certain conditions, sufficient energy may be absorbed from element 10 so that the system, including the networks associated with tubes 13 and 31 will cease to produce oscillations, or the useful energy output of the system will fluctuate widely.

In accordance with my invention I insert between the output anode circuit of tube 31 and the signal grid or input circuit of tube 13 a variable gain amplifier whose voltage gain is inversely proportional to its input voltage. As will be seen from Fig. 1, I connect the junction between anode 32 and load resistor 36 to a coupling capacitor 37 which is electrically connected by means of conductor 38 to signal grid 39 of a third electron discharge tube 40. Tube 40 is preferably a variable-mu pentode or tetrode of conventional construction. In a preferred embodiment of my invention, the cathode 41 and the suppressor grid 42 of tube 40 are joined together and connected to common ground by conductor 43. The anode 44 is connected by means of conductor 45 to one end of a plate load resistor 46 and also to coupling capacitor 25. The other end of load resistor 46 is connected to conductor 15 and thence to the positive terminal of the direct current power source. Similarly, screen grid 47 is by-passed to common ground by capacitor 48 and is connected to conductor 15 by conductor 49 having in series therewith voltage dropping resistor 50.

The junction between capacitor 37 and signal grid 39 is connected to common ground through one or more resistors 51a and 51b connected in series. As will be more fully explained hereinafter, measurements of variations in voltage generated in solenoid 28 and amplified in the network associated with electron discharge tube 31 may be obtained by a vacuum tube voltmeter connected across resistors 51a and 51b or more preferably across resistor 51b. The provision of control tube 40 and its associated network between the output circuit of tube 31 and the input circuit of tube 13 causes the output energy derived from tube 13 to be maintained substantially constant irrespective of variations in the amount of energy absorbed from element 10.

In a preferred embodiment of my invention arranged for logging subsurface formations penetrated by a borehole, the elements described in the previous paragraphs, together with a direct current power source and a special filter network (designated collectively within the broken line 70 of Fig. 1) are arranged within a cylindrical housing to be described in conjunction with Fig. 2. The cylindrical housing and contents are suspended and moved through the borehole by means of a cable 52 containing insulated conductor 53 and grounded shield 54. An alternating current power source 55 such as an alternating current generator is arranged at the surface of the earth and may be connected through conductor 56 to the primary winding of a voltage step-up transformer 57. In a preferred embodiment, power source 55 is an audio frequency signal generator having an accurately controlled frequency of about 400 cycles although other frequencies may be selected. The secondary winding of transformer 57 is connected through conductor 58 to a condenser 59 which is connected to conductor 53 of cable 52. The alternating current power from source 55 is thus conducted along cable 52 and is preferably passed through a series-resonant network comprising capacitor 60 and iron core inductor 61 tuned to pass alternating currents having a frequency equal to that of the current generated in power source 55. The output of this network may then be rectified in a conventional voltage doubler rectifier and filter system, designated generally by the elements enclosed within the broken line rectangle 62 in Fig. 1, to supply direct current power to conductor 15.

In order to measure variations in energy which may be reflected from subsurface formations and cause damping of the vibrations of element 10 and thereby cause changes in the voltage generated in solenoid 28, the varying potential developed across resistor 51b is passed through conductor 63 into a conventional attenuator-filter network comprising elements such as are schematically represented within the broken lines designated by the numeral 64. Filter network 64 is arranged to attenuate voltages having a frequency equal to that of power source 55 but to pass other voltages. The direct current voltage entering filter network 64 through conductor 63 is fed into conductor 53 of cable 52 and may be measured by a conventional electron discharge tube voltmeter including elements such as are shown enclosed within the broken line 65. To prevent alternating current voltages having a frequency equal to that of power source 55 from entering voltmeter 65, a filter network 66, substantially identical to filter network 64, is interposed in conductor 67 which connects measuring means 65 to conductor 53 of cable 52.

It will be apparent that measuring means 65 is preferably provided with a continuous recording galvanometer 68 capable of producing a permanent record of changes in current plotted against position of the logging device in a manner well known in the well logging art. For simplification in the drawing, means for correlating the position of the well logging device with the measurement have not been shown.

Although in the schematic representation of measuring means 65, power for the operation of the electron discharge tube voltmeter is shown as being derived from batteries it will be understood that this power may be suitably drawn through rectifiers and filters from source 55. Likewise, although conventional heaters and means for heating them are not shown in conjunction with tubes 13, 31 and 40, it will be understood that these tubes are provided with electric heaters or filaments which may be energized by current from the output of inductor 61 through a conductor 69.

In the foregoing paragraphs I have described the network associated with tube 40 as a variable gain amplifier whose voltage gain is inversely proportional to its input voltage. The variation in voltage gain is accomplished by furnishing grid 39 with no initial bias. It will be seen that each positive half cycle of alternating current voltage developed across resistor 36 causes electrons to be attracted to grid 39 in proportion to the amplitude of the positive half of the alternating current cycle. These electrons charge capacitors 37, 59, 60 and the capacitors in filter networks 64 and 66, as well as the distributed capacity between conductor 53 and shield 54, to a voltage which is a negative direct current voltage with respect to common ground. This negative voltage is proportional to the alternating current voltage generated across load resistor 36 and, accordingly, is proportional to the alternating current voltage generated across solenoid 28. The negative voltage thus produced furnishes the bias for tube 40 and, since the tube is a variable mu tube, its gain is inversely proportional to the bias voltage and hence to the alternating current voltage presented to grid 39. The rectified grid voltage leaks off through resistors 51a and 51b thereby giving the control system a time constant which is proportional to the product of the resistance of resistors 51a and 51b and the combined capacitance of the capacitors 37, 59, 60, and the capacitors in filters 64 and 66, as well as the distributed capacity of cable 52.

While I have described a preferred embodiment of my invention in conjunction with Fig. 1 employing an alternating current power source 55, it is to be understood that under some conditions I may employ a direct current power source thereby eliminating transformer 57, capacitor 60, inductor 61, rectifier-filter network 62, and filter networks 64 and 65. Under these conditions it is preferable to employ a separate conductor (not shown) in cable 52 for connecting conductor 63 to conductor 67.

Turning now to Fig. 2, one embodiment of a well logging device adapted to be used with the improvements of my invention will be described. In this embodiment elongated magnetostrictive metal tube 10 is affixed midway between the ends thereof to a ring wedge 71. Ring wedge 71 is securely seated in a conical seat member 72 which, in turn, is secured to an outer cylindrical housing 73. This method of mounting element 10 within housing 73 so that the magnetostrictive element is free to vibrate is specifically disclosed and claimed in copending application Ser. No. 776,549, filed September 27, 1947, for C. H. Kean, now Patent No. 2,497,172.

Cylindrical housing 73 is provided with end-members 74 and 75. End member 74 is provided with a small passage 76 adapted to be closed by a valve or other suitable means such as a cap screw 77. Similarly, end member 75 is provided with a small passage 78 adapted to be closed by suitable means such as cap screw 79. Passages 76 and 78 are provided so that the interior of the device included between the walls of housing 73 and end members 74 and 75 may be completely filled with a liquid such as water adapted to transmit vibrations from element 10 to the walls of housing 73.

Midway between the ends and concentrically within tubular element 10 a high conductivity, non-magnetic metal plate member 80 is spacedly affixed to the walls of element 10 by means of a plurality of pin members 80a. Spool-like members 81 and 82 upon which are wound, respectively, solenoids 12 and 28 are securely fastened co-axially within but not touching the walls of element 10 by means of a non-magnetic metal bolt 83. Bolt 83 also secures permanent magnets 11 and 11' at the outer ends of the solenoid structure including spool-like members 81 and 82 and plate member 80. The solenoid structure, and particularly non-magnetic metal plate 80 in association therewith, is specifically disclosed and claimed in copending application Serial No. 786,756, filed November 18, 1947, for C. H. Kean, now Patent No. 2,490,273.

A cable 52 containing conductors 53 and 54 is securely fastened into the upper end of end-member 75 in a manner such that the conductors may enter a cavity 84 in which is mounted the elements enclosed by the broken line 70 in Fig. 1. Conductors 14 and 15 provide electrical connections between solenoid 12 and the respective elements described in Fig. 1. Similarly, conductor 29 provides electrical connection between one end of solenoid 28 and the signal grid of electron discharged tube 31 described in Fig. 1. The other end of solenoid 28 may be connected to the metal plate 80 which may serve as a common ground return through the metal housing to the elements included in housing 70.

When logging subsurface formations with the device illustrated in Figs. 1 and 2, the magnetostrictive element is operated as a transducer capable of converting electric energy to acoustic energy and also capable of converting acoustical energy reflected from the walls of a borehole to electrical energy. The transducer is lowered into the borehole and moved along the walls thereof. When electrical energy from power source 55 is introduced into cable 52, an alternating voltage is produced in solenoid 12 and causes magnetostrictive element 10 to vibrate at its resonant frequency producing acoustic waves which are cylindrically symmetric in nature and are radiated to the walls of the borehole. If the walls of the borehole adjacent the transducer are relatively "hard," a major portion of the acoustic energy is reflected back and tends to damp the vibration of element 10. On the other hand, if the walls of the borehole adjacent the transducer are relatively soft, a portion of the acoustic energy is absorbed and is not reflected back to the transducer. Accordingly, the magnitude of vibration of element 10 will vary with the relative hardness of the walls of the borehole. By providing the electron tube network associated with electron discharge tube 40, the voltage input to solenoid 12 is maintained constant and the varying voltage produced in solenoid 28 as a result of fluctuating vibration of element 10, caused by different degrees of damping thereof, produces a fluctuating direct current voltage across resistors 51a and 51b. This voltage is a function of the acoustic energy reflected into the transducer by the subsurface formations and is, therefore, proportional to a function of the acoustic impedance of formations adjacent the transducer.

Having fully described and illustrated the present invention, what I wish to secure by Letters Patent is:

1. In an oscillator system including first and second electron discharge tube networks, each having at least a signal grid input circuit and an anode output circuit, and including a coupled pair of solenoids with the first of said solenoids electrically connected as a load impedance in the anode output circuit of said first tube network and a second of said solenoids electrically connected in the signal grid input circuit of said second tube network whereby a portion of the output energy of said system is coupled into the input circuit of said second tube network sufficient to maintain oscillation in the system, the improvement which comprises an electron tube control network having a voltage gain inversely proportional to the input voltage thereof interposed between the input circuit of said first tube network and the output circuit of said second tube network whereby the alternating current voltage across said load impedance is maintained substantially constant under varying load conditions.

2. In a magnetostriction transducer system including first and second electron discharge tube networks, each having at least a signal grid input circuit and an anode output circuit, and including a magnetostrictive metal element and a pair of solenoids electro-magnetically coupled by said element with a first of said solenoids electrically connected as said load impedance in the anode output circuit of a first tube network and the second of said solenoids electrically connected in the signal grid input circuit of said second tube network whereby a portion of the output energy of said system is coupled into the input circuit of said second tube network sufficient to maintain oscillation in the system, the improvement which comprises an electron tube control network having a voltage gain inversely proportional to the input voltage thereof interposed between the input circuit of said first tube network and the output circuit of said second tube network whereby the alternating current voltage across said load impedance is maintained substantially constant under varying load conditions upon said transducer.

3. An apparatus for logging subsurface formations penetrated by a borehole comprising a magnetostriction transducer adapted to be moved through the borehole, an electron discharge tube oscillator network electrically connected to the transducer for continuously generating an alternating current voltage capable of exciting said transducer and causing it to produce acoustic energy, an electron tube control network having a voltage gain inversely proportional to the input voltage thereto interposed within said oscillator network for maintaining said alternating current voltage substantially constant, and means electrically connected to the input circuit of said control network for continuously recording a voltage which is proportional to a function of the acoustic impedance of successive formations along the borehole.

4. A magnetostriction transducer system which includes, in combination, a magnetostrictive metal element electro-magnetically coupled to each of a pair of solenoids, a first electron discharge tube network having signal grid input and anode output circuits and having a first of said solenoids connected as a load impedance in the anode output circuit thereof, a second electron discharge tube network having signal grid input and anode output circuits and having a second of said solenoids connected as an impedance in the signal grid input circuit thereof, and a third electron discharge tube network having a voltage gain inversely proportional to the input voltage thereof interposed between and electrically coupling the anode output circuit of said second network and the signal grid input circuit of said first network.

5. A magnetostriction transducer system in accordance with claim 4 and including an electron discharge tube voltmeter network electrically connected to the signal grid circuit of said third electron discharge tube network.

6. A magnetostriction transducer system adapted for use in the logging of subsurface formations penetrated by a borehole which includes, in combination, a magnetostrictive element, a first electron discharge tube network, a first solenoid electro-magnetically coupled to the magnetostrictive element and electrically connected as a load impedance in the anode circuit of said first network, a second electron discharge tube network, a second solenoid electro-magnetically coupled to the magnetostrictive element and electrically connected as an impedance in the signal grid circuit of said second network, a third electron discharge tube network having a voltage gain inversely proportional to the input voltage thereof interposed and electrically coupled between the anode circuit of said second network and the signal grid circuit of said first network, a rectifier and filter network arranged to supply suitable direct current power to said first, second, and third tube networks, a constant frequency alternating current power source, a cable including conductors connecting said power source to said rectifier and filter network arranged to suspend and move said first, second, third and filter networks through the borehole, a first filter network, capable of passing direct current voltages while attenuating alternating current voltages having a frequency substantially that of said power source electrically connected adjacent said rectifier between the signal grid circuit of said third electron discharge tube network and the conductors in said cable, an electron discharge tube voltmeter network, and a second filter network of similar capability to said first filter network connected adjacent said power source between the input of said voltmeter and the conductors in said cable.

7. An oscillator system comprising first and second electron tube networks each having an input circuit and an output circuit, means connected in the output circuit of said first tube network for deriving output energy therefrom, means for coupling a portion of said output energy into the input circuit of said second tube network to sustain oscillation in the system, and an electron tube control network having a voltage gain inversely proportional to the input voltage thereto interposed between the output circuit of said second tube network and the input circuit of said first tube network whereby the output energy of said system is maintained substantially constant.

FRANK N. TULLOS.

REFERENCES CITED

The following references are of record in the file of this patent:

UNITED STATES PATENTS

| Number | Name | Date |
|---|---|---|
| 2,088,324 | John | July 27, 1937 |
| 2,200,476 | Mounce | May 14, 1940 |
| 2,244,484 | Beers | June 3, 1941 |
| 2,251,817 | Athey | Aug. 5, 1941 |
| 2,444,349 | Harrison | June 29, 1948 |
| 2,451,021 | Detuno | Oct. 12, 1948 |
| 2,466,904 | Lundstrom | Apr. 12, 1949 |